US009649968B2

(12) United States Patent
Schroeder et al.

(10) Patent No.: US 9,649,968 B2
(45) Date of Patent: May 16, 2017

(54) CONTROL SYSTEM

(71) Applicants: Matthew Wendell Schroeder, Ventura, IA (US); Mitchell Paul Horstman, Britt, IA (US)

(72) Inventors: Matthew Wendell Schroeder, Ventura, IA (US); Mitchell Paul Horstman, Britt, IA (US)

(73) Assignee: Stellar Industries, Inc., Garner, IA (US)

( * ) Notice: Subject to any disclaimer, the term of this patent is extended or adjusted under 35 U.S.C. 154(b) by 870 days.

(21) Appl. No.: 13/623,650

(22) Filed: Sep. 20, 2012

(65) Prior Publication Data

US 2014/0077112 A1 Mar. 20, 2014

(51) Int. Cl.

*B60P 1/16* (2006.01)
*B60P 1/28* (2006.01)
*H01H 13/18* (2006.01)

(52) U.S. Cl.

CPC ............... *B60P 1/283* (2013.01); *B60P 1/162* (2013.01); *H01H 13/18* (2013.01); *Y10T 74/20582* (2015.01)

(58) Field of Classification Search

CPC ......... B60P 1/283; B60P 1/6463; B60P 1/162; Y10T 74/20582; H01H 13/18

USPC .......... 137/899; 298/22 C, 22 R; 411/2, 3, 4; 74/471 R; 403/2

See application file for complete search history.

(56) References Cited

U.S. PATENT DOCUMENTS 3,784,162 A * 1/1974 Channell .................. B60P 1/20 298/22 J
4,984,958 A * 1/1991 Kaczmarczyk ....... E02F 3/3622 403/2
6,659,566 B2 * 12/2003 Bombardier ............... B62J 1/12 298/22 R

* cited by examiner

*Primary Examiner* — Stephen Gordon
(74) *Attorney, Agent, or Firm* — David M. Breiner; BrownWinick Law Firm

(57) ABSTRACT

Disclosed is a control system that may include a tab pivotally connected to a structure, a coupling member pivotally connected to the structure, and a device operatively connected to the tab via the coupling member, wherein the device is configured to control an external system. Disclosed also is a vehicle that may include a first device and a control system. The control system may include a tab pivotally connected to a structure, a coupling member pivotally connected to the structure, a frangible member connecting the tab and the coupling member to the structure, and a second device operatively connected to the tab via the coupling member, wherein the second device is configured to control the first device.

19 Claims, 22 Drawing Sheets

CONTROL SYSTEM

BACKGROUND

1. Field

Example embodiments are drawn to a control system. In particular, example embodiments are drawn to a control system which includes a tab, a coupling member coupled to the tab, and a device operatively connected to the tab via the coupling member. Example embodiments are also drawn to a vehicle that uses the control system.

2. Description of the Related Art

In the conventional art, some trucks are fitted with frames that allow dumpsters to be loaded and unloaded thereon. Some of the frames include tilt and dump links used in tilting and dumping operations.

FIG. 1 is a partial view of a dump link 10 associated with a conventional truck. As shown in FIG. 1, the dump link 10 is fitted with a tilt tab 40 that is configured to engage a tilt tab of a tilt link. As shown in FIG. 2, the tilt tab 40 may be comprised of a metal bar 42 welded to a rectangular tube 44. The metal bar 42 includes a bore 46 through which at least a portion of a frangible member 30 (see FIG. 1), for example, a break away bolt, may be inserted. The frangible member 30 holds the tilt tab 40 in place. The tilt tab 40 is pivotally supported in the dump link 10 by a bolt 20 which, as shown in FIG. 1, passes through the dump link 10 and the rectangular tube 44 of the tilt tab 40.

In the conventional art, the frangible member 30 may include a body (not shown) that passes through a hole 12 (see FIG. 4) of the dump link 10 and through the bore 46 of the tilt tab 40. A head of the frangible member 30 is sized so that it does not pass through the hole 12 of the dump link 10. In the conventional art, the frangible member 30 is configured to hold the tilt tab 40 in place so that an upper surface of the tilt tab 40 is held against an inner upper surface of the dump link 10.

In the conventional art, the tilt tab 40 is configured to engage a tilt tab of a tilt section. In certain circumstances, for example, when the tilt section is improperly operated, the tilt tab of the tilt section may apply a relatively large force P on the tilt tab 40 as shown in FIG. 3. If the force P is relatively large, the frangible member 30 holding the tilt tab 40 against the inner upper surface of the dump link 10 breaks allowing the tilt tab 40 to rotate to a downward position as shown in FIG. 4. Incorporation of the frangible member 30, as shown in FIGS. 1-4, has resulted in reduced damage to the dump link 10 since the frangible member 30 prevents relatively large forces from being transferred thereto.

SUMMARY

Example embodiments are drawn to a control system. In particular, example embodiments are drawn to a system which includes a tab, a coupling member coupled to the tab, and a device operatively connected to the tab via the coupling member. Example embodiments are also drawn to a vehicle that uses the control system.

In accordance with example embodiments, a control system may include a tab pivotally connected to a structure, a coupling member pivotally connected to the structure, and a device operatively connected to the tab via the coupling member, wherein the device is configured to control an external system.

In accordance with example embodiments, a vehicle may include a first device and a control system. The control system may include a tab pivotally connected to a structure, a coupling member pivotally connected to the structure, a frangible member connecting the tab and the coupling member to the structure, and a second device operatively connected to the tab via the coupling member, wherein the second device is configured to control the first device.

BRIEF DESCRIPTION OF THE DRAWINGS

Example embodiments are described in detail below with reference to the attached drawing figures, wherein.

DETAILED DESCRIPTION

Figure 1:
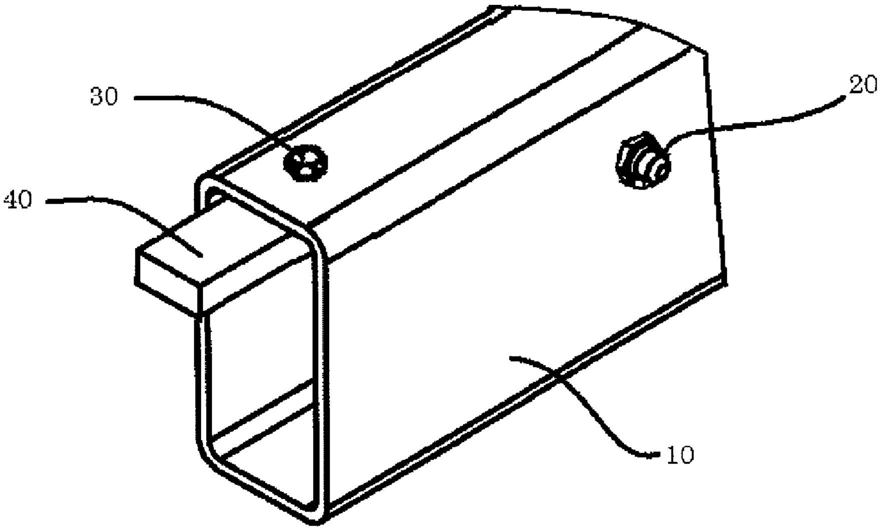
FIG. 1 is a partial view of a conventional dump link with a conventional tilt tab attached thereto.
Figure 2:
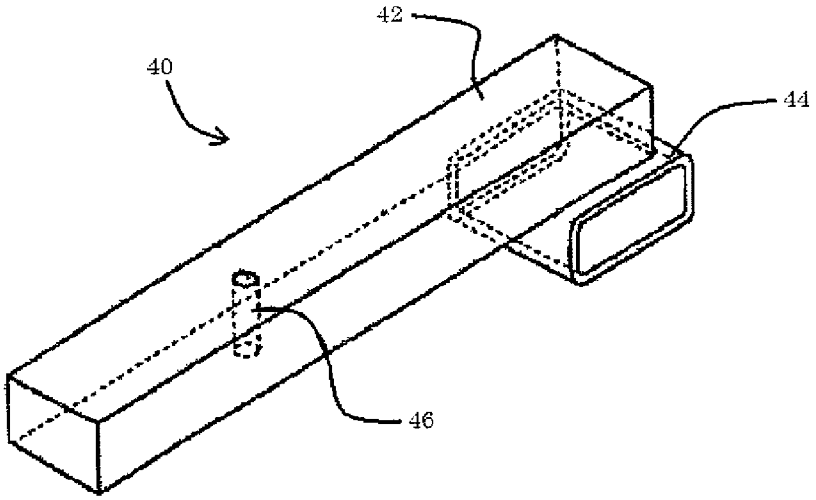
FIG. 2 is a view of the conventional tilt tab.
Figure 3:
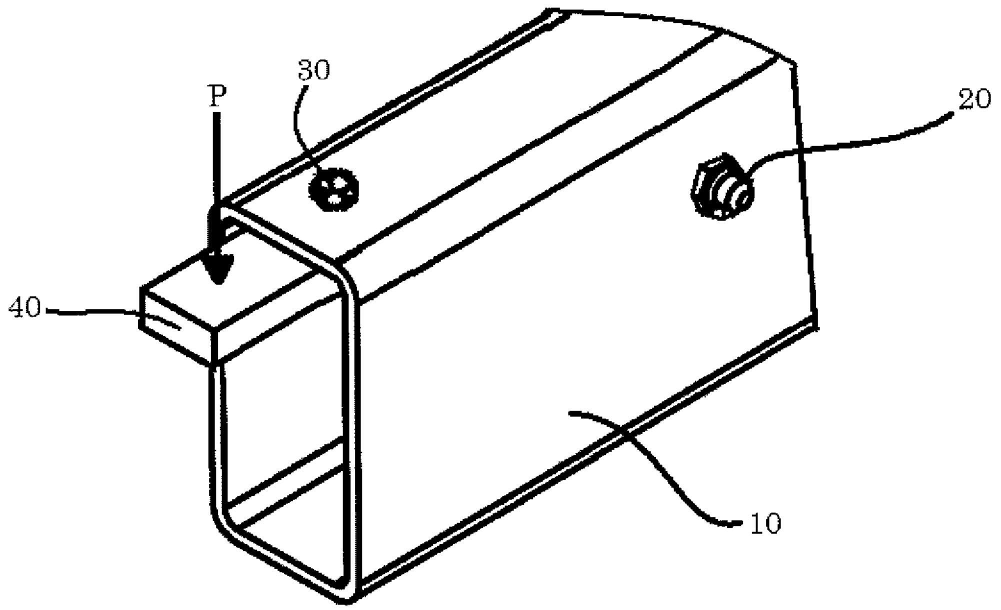
FIG. 3 is a view of the conventional tilt tab attached to the conventional dump link by a frangible member.
Figure 4:
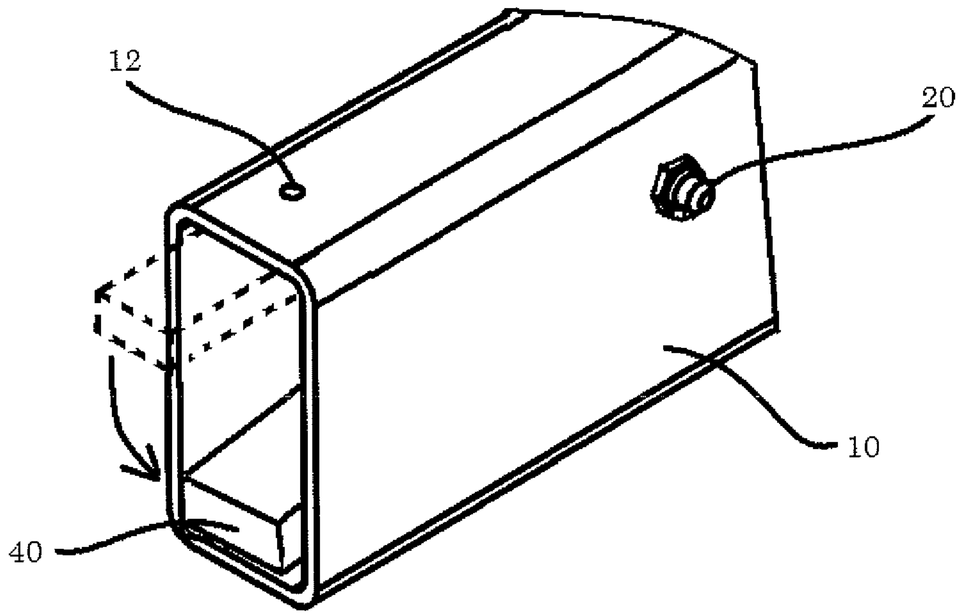
FIG. 4 is a view of the conventional tilt tab pivoting within the conventional dump link.

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Example embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a control system.

Figure 5:
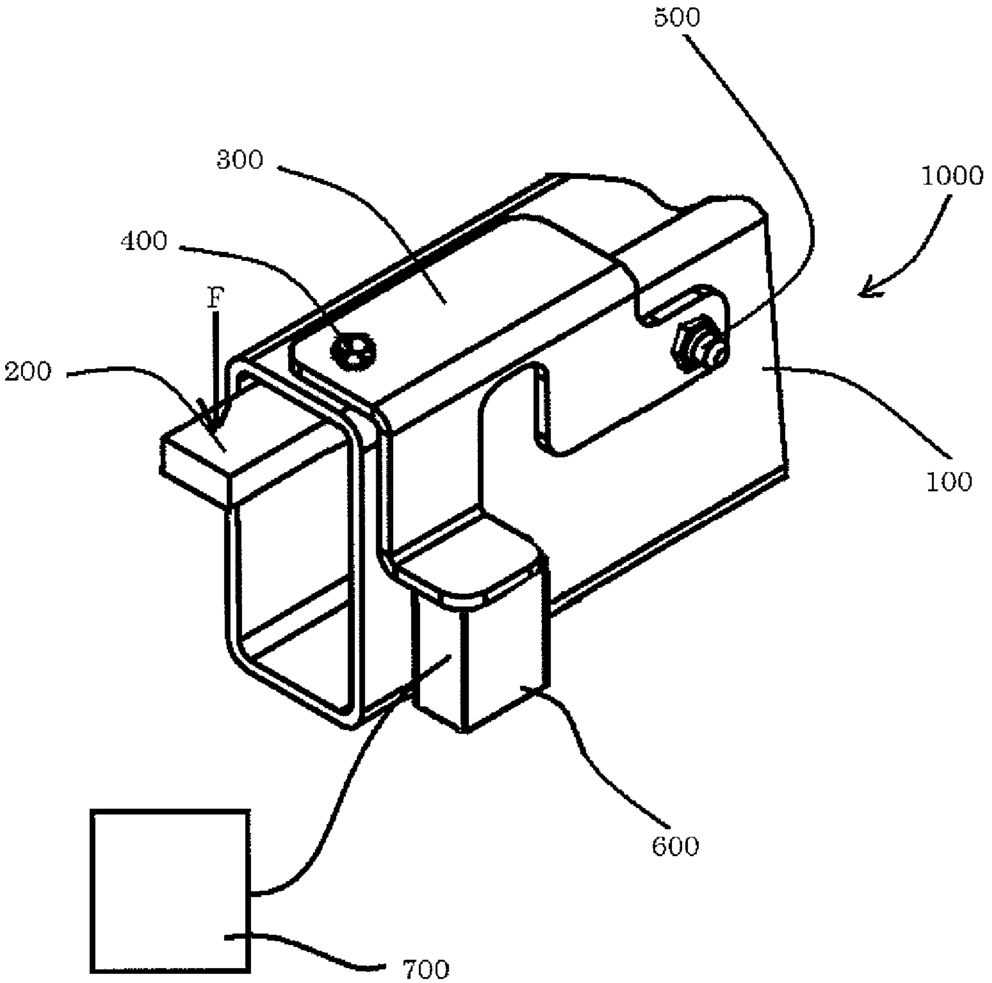
FIG. 5 is a view of a control system in accordance with example embodiments.
Figure 6:
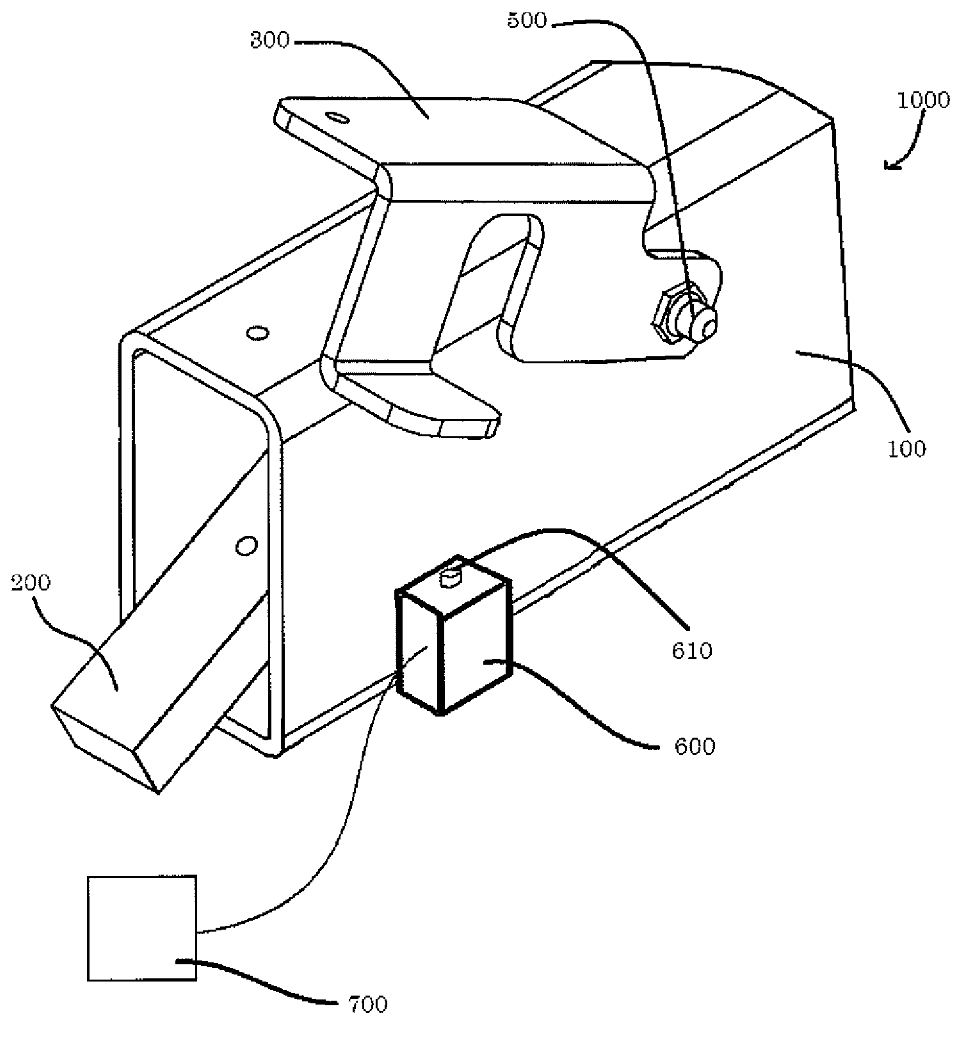
FIG. 6 is another view of the control system in accordance with example embodiments.

FIGS. 5 and 6 are views of a control system 1000 in accordance with example embodiments. As shown in FIGS. 5 and 6, the control system 1000 may include a tilt tab 200 operatively connected to a device 600 by a coupling member 300. The device 600 may be configured to send feedback to, or control, an external system 700. The device 600 may be, for example, a sensor or a valve. The external system 700, for example, may be hydraulic, pneumatic, or electrical in nature. For example, the external system 700 may be, or may include, a hydraulic or pneumatic cylinder.

In example embodiments, the tilt tab 200 and the coupling member 300 may be attached to a structural member 100. The structural member 100, for example, may be, but is not limited to, a tubular member as shown in FIGS. 5 and 6. In example embodiments, a connecting member 500, for example, a bolt, may be provided to pivotally attach the tilt tab 200 and the coupling member 300 to the structural member 100. In addition, a frangible member 400, may be used to fix the tilt tab 200 and the coupling member 300 in a first position as illustrated in FIG. 5. In example embodiments the frangible member 400 may be, but is not limited to, a break away bolt.

Figure 7A:
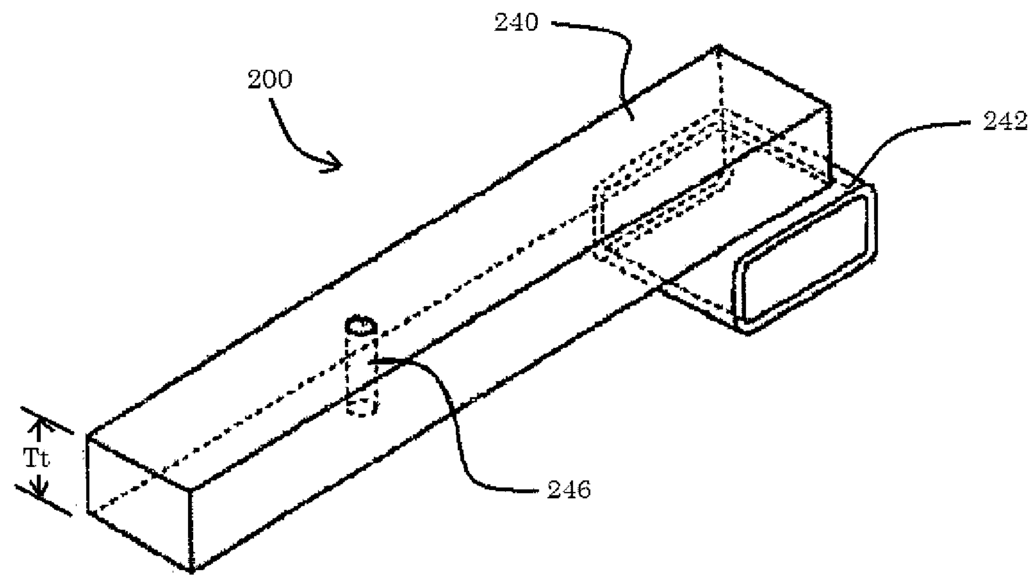
FIGS. 7A-7C are views of a tilt tab in accordance with example embodiments.
Figure 7B:
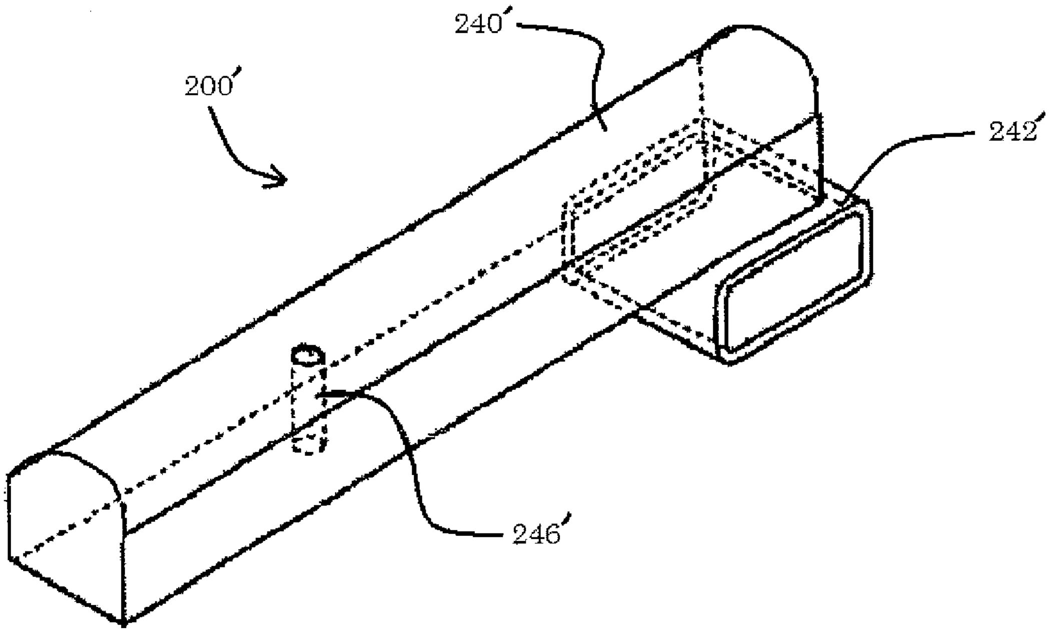
Figure 7C:
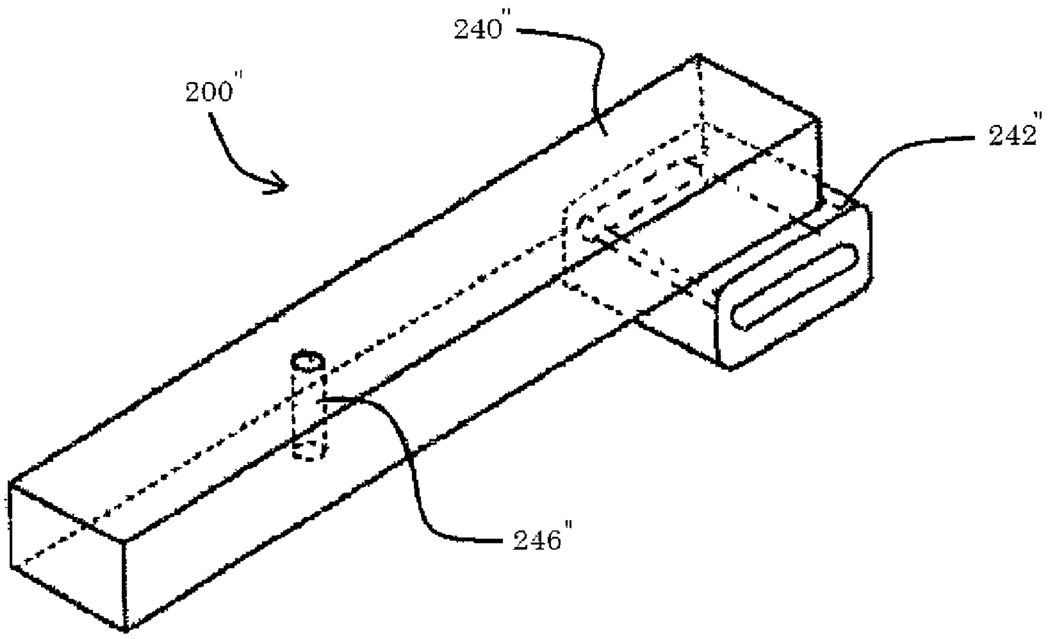
Figure 8A:
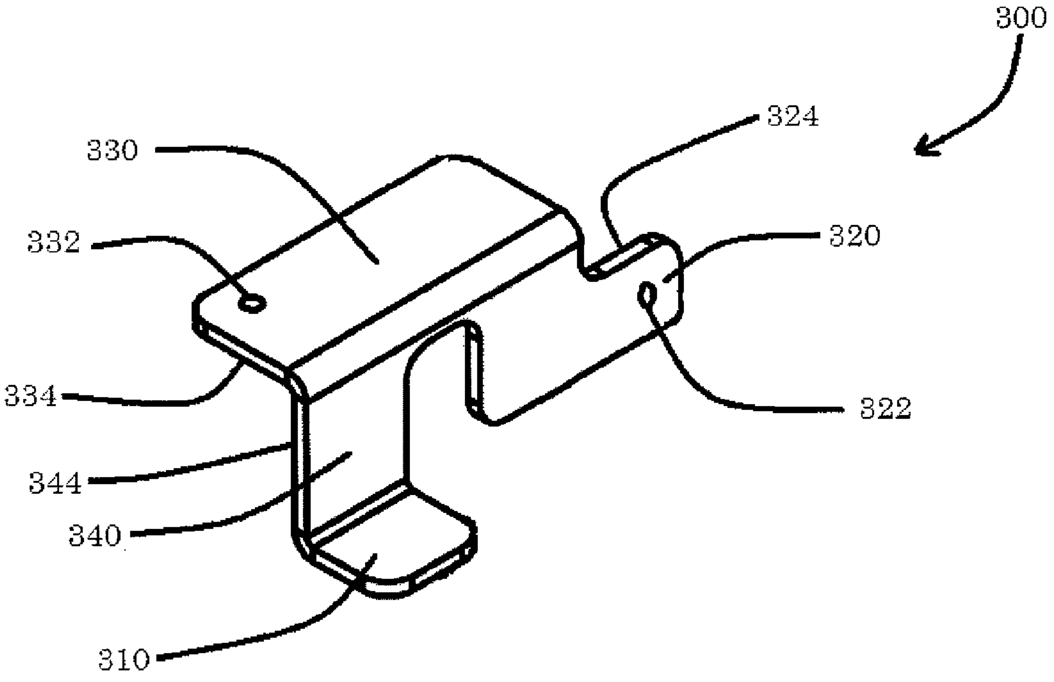
FIGS. 8A-8D are views of a coupling member in accordance with example embodiments.
Figure 8B:
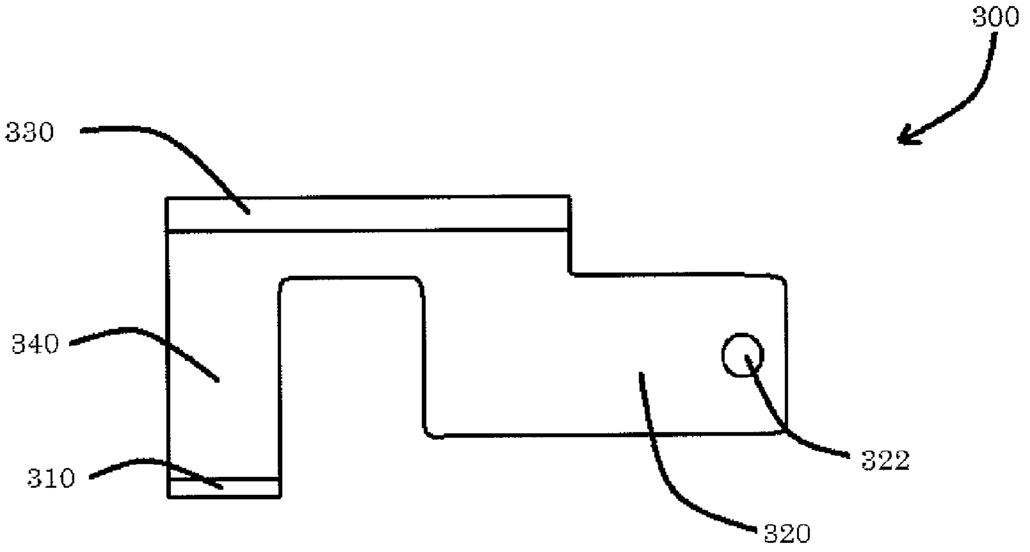
Figure 8C:
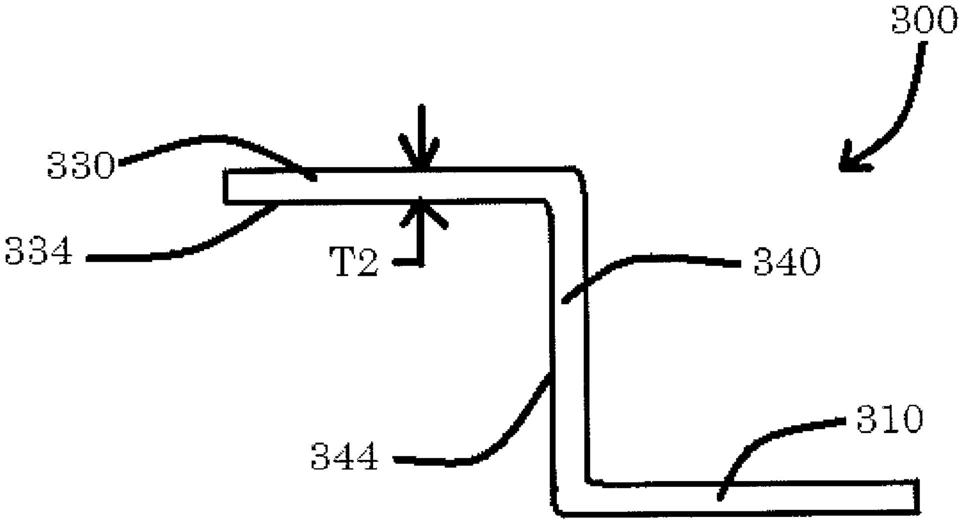
Figure 8D:
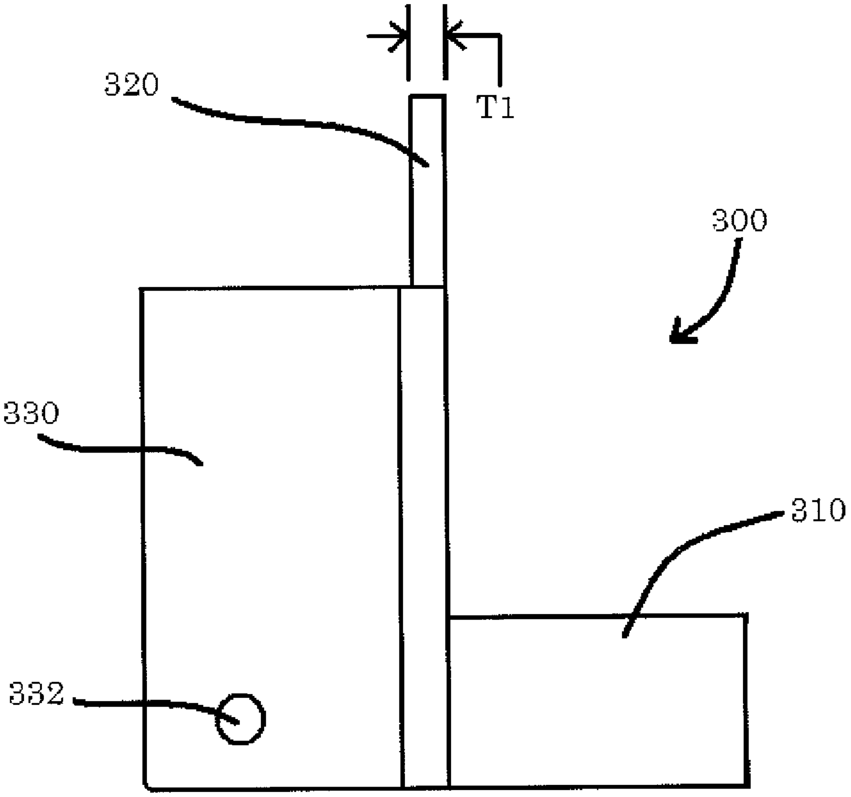

In example embodiments, the tilt tab 200 may be a structure that is configured to pivotally attach to the structural member 100. FIG. 7A is a nonlimiting example of the tilt tab 200 in accordance with example embodiments. As shown in FIG. 7A, the tilt tab 200 may be comprised of a bar 240 and a tube 242. The bar 240 may, for example, be a rectangular metal bar, however example embodiments are not limited thereto. For example, the bar 240 may have, but is not limited to, another cross section such as a circular, square, or elliptical cross section. Similarly, the tube 242 is not limited to a rectangular tube as the cross section of the tube 242 may be, but is not limited to, square tube or a tube with an annular cross section. In example embodiments, the bar 240 may include a bore 246 which through which a portion of the frangible member 400 may be inserted. Although FIG. 7A illustrates an example of the tilt tab 200, the particular disclosed embodiment is not meant to be a limiting feature of example embodiments. For example, FIGS. 7B and 7C illustrate additional examples of a tilt tab usable with example embodiments. For example, in FIG. 7B, the tilt tab 200' is shown as having a bar 240' attached to a tube 242' wherein the bar 240' includes a bore 246'. However, in FIG. 7B, the tilt tab 200' has a curved upper surface rather than a flat upper surface. FIG. 7C illustrates a tilt tab 200" having a bar 240" with a bore 246" therein. In FIG. 7C the bar 240" is attached to a block member 242" that has a slotted hole cut therethrough.

Though not shown in the figures, it is understood that the tilt tab of example embodiments may be comprised of a one piece casted member that may resemble anyone of the tilt tabs 200, 200' and 200". For example, rather than constructing anyone of the tilt tabs 200, 200', and 200" by attaching a bar 240, 240', and 240" to a tube 242, 242', or a block member 242", a casting process may be used to manufacture a one piece tilt tab having substantially the same features as any one of the tilt tabs 200, 200', and 200". As mentioned above, the example tilt tabs 200, 200', and 200" (or a one piece version thereof) are not meant to limit the invention but are provided merely as examples of tilt tabs usable with example embodiments.

FIGS. 8A-8D illustrate views of a nonlimiting example of the coupling member 300. As shown in FIGS. 8A-8D the coupling member 300 may have a first portion 310, a second portion 320, a third portion 330, and a fourth portion 340. The first portion 310, for example, may resemble flat rectangular plate as shown in at least FIG. 8A. This aspect of example embodiments, however, is not meant to be a limiting feature of the invention as the first portion 310 may resemble another structure, for example, a triangular plate, a hexagonal plate, or a plate with multiple shapes (for example, a paddle shape). In addition, the first portion 310 may be curved or may have a varying thickness instead of a constant thickness. In example embodiments, the first portion 310 may extend to contact the device 600.

The second portion 320 of the coupling member 300 may likewise resemble a flat rectangular plate having a constant thickness T1. This aspect of example embodiments, however, is not meant to be a limiting feature as the second portion 320 may have another shape and may have a varying thickness. For example, other nonlimiting examples of the second portion 320 include an elliptical shape, and a triangular shape. In example embodiments, the second portion 320 may include a first aperture 322 through which at least a portion of the connecting member 500 may be inserted.

For example, the first aperture 322 may be a substantially circular hole. In example embodiments, the second portion 320 may include a first surface 324 configured to bear against the structural member 100. The first surface 324, for example, may resemble a flat surface. However, example embodiments are not limited thereto.

The third portion 330 of the coupling member 300 may resemble a flat rectangular plate having a constant thickness T2. Example embodiments, however, are not limited thereto as the third portion 330 may resemble another shape and may have a varying thickness. For example, other nonlimiting examples of the third portion 330 include an elliptical shape, a triangular shape, a square shape, a stepped shape, and a saddle shape. In example embodiments, the third portion 330 may include a second aperture 332 through which at least a portion of the frangible member 400 may be inserted. In example embodiments, the third portion 330 may include a second surface 334 configured to bear against the structural member 100. The second surface 334, for example, may resemble a flat surface. However, example embodiments are not limited thereto. For example, in the event the structural member 100 is comprised of a circular tube, the third portion 330 may have a semicircular shape. Thus, the second surface 334 may likewise have a semicircular profile.

The fourth portion 340 of the coupling member 300 may resemble a flat rectangular plate and may connect the first and third portions 310 and 330 together. Example embodiments, however, are not limited thereto as the fourth portion 340 may resemble another shape. For example, other nonlimiting examples of the fourth portion 340 include an elliptical shape, a triangular shape, a square shape, or a stepped shape. In example embodiments, the fourth portion 340 may include a third surface 344 configured to bear against the structural member 100. The third surface 344, for example, may resemble a flat surface. However, example embodiments are not limited thereto. For example, in the event the structural member 100 is comprised of a circular tube, the third surface 344 may include a semicircular surface.

Figure 9:
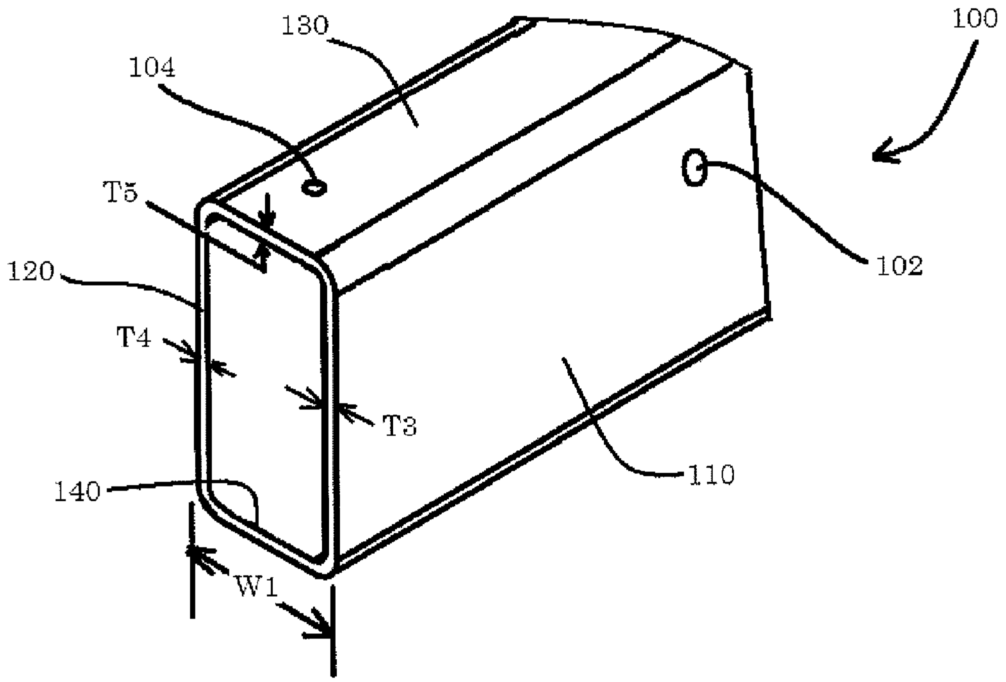
FIG. 9 is a view of a structural member in accordance with example embodiments.

FIG. 9 is a view of the structural member 100 in accordance with example embodiments. As shown in FIG. 9, the structural member 100 may be formed from a rectangular tube having a first side 110, a second side 120, a third side 130, and a fourth side 140. In example embodiments the structural member 100 may include a third aperture 102 extending through the first side 110 thereof. Though not shown in the figures, it is understood that the structural member 100 may include a corresponding fourth aperture on the second side 120. The third side 130 may include a fifth aperture 104 extending through the third side 130. In example embodiments, the fifth aperture 104 may be configured to allow the frangible member 400 to pass therethrough. Although example embodiments, illustrate the structural member 100 as a rectangular tube, example embodiments are not limited thereto. For example, other nonlimiting examples of the structural member 100 include a square tube or a circular tube. Other nonlimiting examples of the structure member 100 may include a C-shaped member (for example, channel iron) or an I-shaped section.

In example embodiments, the first side 110, the second side 120, and the third side 130 of the structural member 100 may have a third thickness T3, a fourth thickness T4, and a fifth thickness T5. In example embodiments, the third, fourth, and fifth thicknesses T3, T4, and T5 may be substantially the same, though example embodiments are not limited thereto as the third, fourth, and fifth thicknesses T3, T4, and T5 may be different.

Figure 10A:
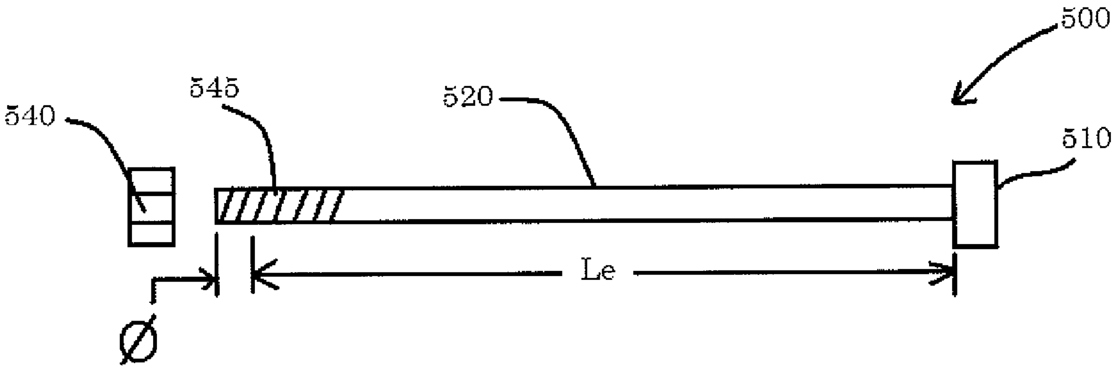
FIGS. 10A and 10B are views of connecting members in accordance with example embodiments.
Figure 10B:
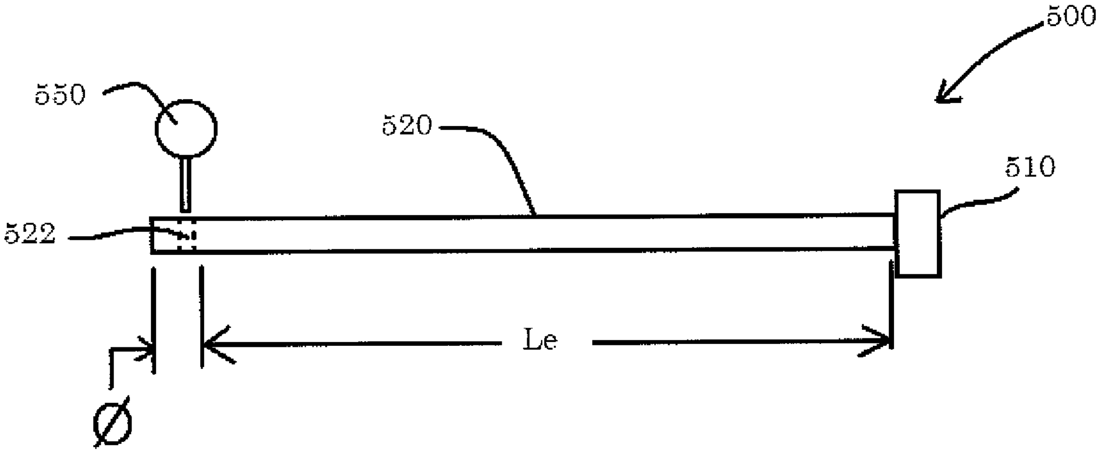

FIGS. 10A and 10B are views of example connecting members 500 usable with example embodiments. As alluded to earlier, the connecting member 500 may be a bolt that is inserted through the first aperture 322 of the coupling member 300, and through the third 102 and fourth apertures of the structural member 100. In FIGS. 10A and 10B the example connecting member 500 is illustrated as including a head 510 and a body 520. The body 520 may resemble a cylindrical rod which may or may not be threaded. For example, in FIG. 10A the body 520 is illustrated as having a threaded end 545 whereas in FIG. 10B the body 520 is illustrated as having an unthreaded body. In FIG. 10B the body 520 includes a hole 522 into which a pin 550, for example, a cotter pin, may be inserted in order to secure the connecting member 500 in place.

Referring back to FIGS. 10A and 10B the body 520 may be configured with a length Le sufficient to span the thickness T1 of second portion 320 of the coupling member 300 and a width W1 of the structural member 100. The body 520 may also have an additional length $\phi$ which may allow a secondary structure, for example, a nut 540 or the pin 550 to secure the connecting member 500 in place. The body 520 of the connecting member 500 may be sized so that the body 520 is insertable into the first aperture 322 of the coupling member 300 and the third 102 and fourth apertures of the structural member 100. For example, each of the first 322, third 102, and fourth apertures may be circular holes and the body 520 may be cylindrical structure having an outer diameter smaller than the diameters of the circular holes. The head 510 of the connecting member 500 may be configured to prevent the body 520 of the connecting member 500 to pass completely through the first 322, third 102, and fourth apertures. For example, the head 510 may resemble a short cylindrical structure having a diameter larger than a diameter of the first aperture 322 of the coupling member 300.

In example embodiments, the body 520 of the connecting member 500 may be inserted into the tilt tab 200. For example, referring to FIGS. 7A, 7B, 7C, 10A, and 10B, the body 520 may be inserted into the tube 242 of the tilt tab 200, the tube 242' of the tilt tab 200', or the block 242" of the tilt tab 200". Thus, in example embodiments, one of the tilt tabs 200, 200', and 200" and the coupling member 300 may be connected to the structural member 100 by a common connecting member, for example, the connecting member 500. Furthermore, because the type of connection between the coupling member 300 and the structural member 100 and between one of the tilt tabs 200, 200', and 200", and the structural member 100 is a pin-type connection, each of the tilt tabs 200, 200', and 200" and the structural member 100 may be free to pivot about the connecting member 500 and thus may be free to pivot with respect to the structural member 100.

Figure 11:
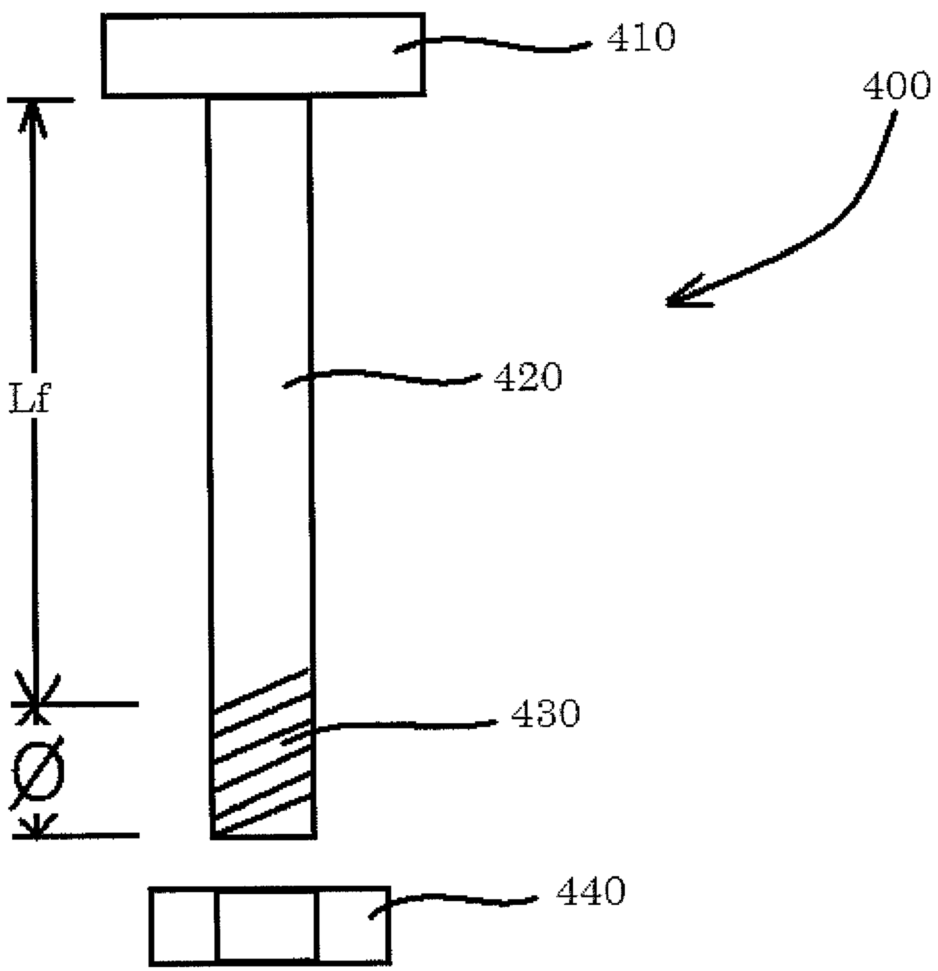
FIG. 11 is a view of a frangible member in accordance with example embodiments.

In example embodiments the frangible member 400 may be a break away bolt. For example, as shown in FIG. 11, the frangible member 400 may include a head 410 and a body 420. The body 420 may resemble a cylindrical structure with a threaded end 430. The threaded end 430 may be configured to engage a nut 440. In example embodiments, the body 420 may have a length Lf sufficient to penetrate the third portion 330 of the coupling member 300 and the tilt tab 200. For example, in the event the tilt tab 200 has a thickness of Tt, the third side 130 of the structural member 100 has a thickness of T5, and the third portion 330 of the coupling member 300 has a thickness T2, the length Le of the body 420 may be about the same as, or larger than the sum of the thickness T5 of the third side 130, the thickness T2 of the coupling member 300, and the thickness Tt of the tilt tab 200. In example embodiments, the body 420 may have an additional length ϕ for allowing the nut 440 to attach thereto and fix the tilt tab 200 and the coupling member 300 in place. For example, the frangible member 400 may be configured such that when it is installed, an upper surface of the tilt tab 200 bears against a lower surface of the third side 130 of the structural member 100 and a lower surface of the third portion 330 of the coupling member 300 bears against an upper surface of the third side 130 of the structural member 100.

Example embodiments are not limited to the frangible member 400 disclosed in FIG. 11. For example, the bores 246, 246', and 246" may be internally threaded with threads configured to engage threads the threaded end 430 of the frangible member 400. Thus, the body 420 of the frangible member 400 need only have a length long enough to reach the bores 246, 246', and 246". In other words, the body is 420 is not required to have a length which fully penetrates the tilt tab 200, 200', and 200". In addition, the orientation of the frangible member 400 is not limited by the above example. For example, the head 410 may actually bear against a bottom surface of one of the tilt tabs 200, 200', and 200" whereas the nut 440 may bear against a top surface of the third region 330 of the coupling member 300. In addition, the body 420 of the frangible member 400 need not be threaded. For example, rather than providing a body 420 with a threaded end, the body 420 may have a hole through which a pin may be inserted to secure the frangible member in place.

As explained above, because the tilt tab 200 and the coupling member 300 are pivotably attached to the structural member 100, the control system 1000 may assume different configurations. FIG. 5, for example, illustrates a first configuration of the control system 1000 and FIG. 6 illustrates a second configuration of the control system 1000. In the first configuration the tilt tab 200 and the coupling member 300 are held in place by the frangible member 400. For example, the frangible member 400 may be a break away bolt which may have a portion that passes through the second aperture 332 of the coupling member 300 and through the bore 246 of the tilt tab 200. Thus, the tilt tab 200 and the coupling member 300 may be fixed in the first configuration by the frangible member 400. In example embodiments, the first portion 310 of the coupling member 300 may be arranged so as to contact, for example, by pressing, a spring loaded button 610 associated with the device 600. Thus, the device 600 may sense that the coupling member 300 is locked in the first configuration by the frangible member 400 because the first member 310 of the coupling member 300 is pressing the spring loaded button 610.

In example embodiments the frangible member 400 may be broken if a relatively large force is applied thereto. For example, if the control system 1000 is in the first configuration and a relatively large force F is applied to the tilt tab 200 as shown in FIG. 5, the frangible member 400 may break. In the event the large force F is applied to the tilt tab 200 and the frangible member 400 breaks, the tilt tab 200 may move to the second configuration as illustrated in FIG. 6. As a consequence of the frangible member 400 breaking, the coupling member 300 may be incapable of exerting sufficient force on the button 610 to depress it since the coupling member 300 is free to rotate. Therefore, when the frangible member 400 breaks due to the relatively large force, the coupling member 300 may rotate away from the device 600 due to a force applied to the coupling member 300 from the spring loaded button 610. The device 600, accordingly, may sense a relatively large load has been applied to the tilt tab 200 when the button 610 is no longer sufficiently pressed by the coupling member 300.

Figure 12A:
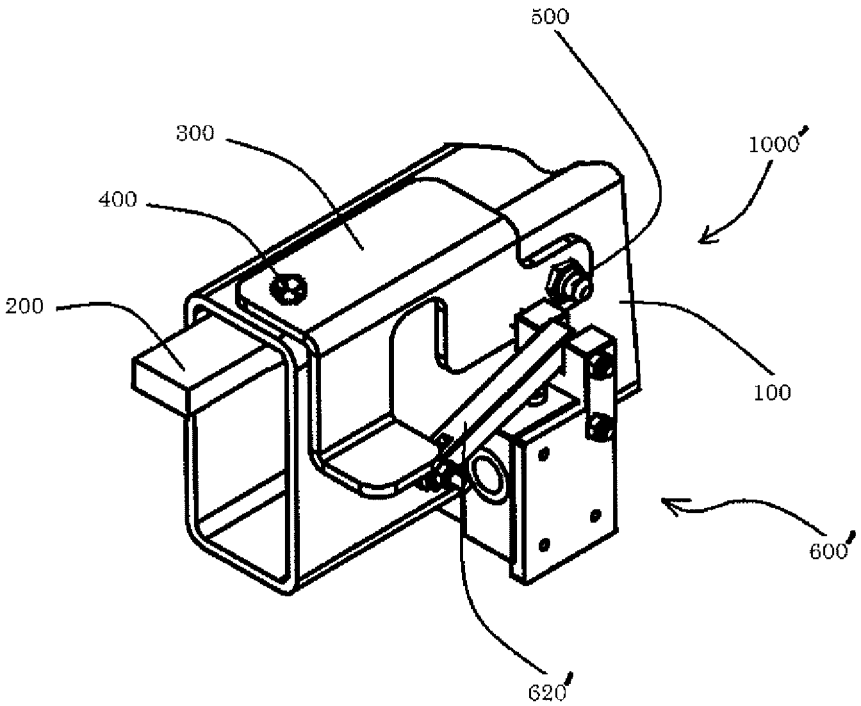
FIGS. 12A-12B are views of a control system in accordance with example embodiments.
Figure 12B:
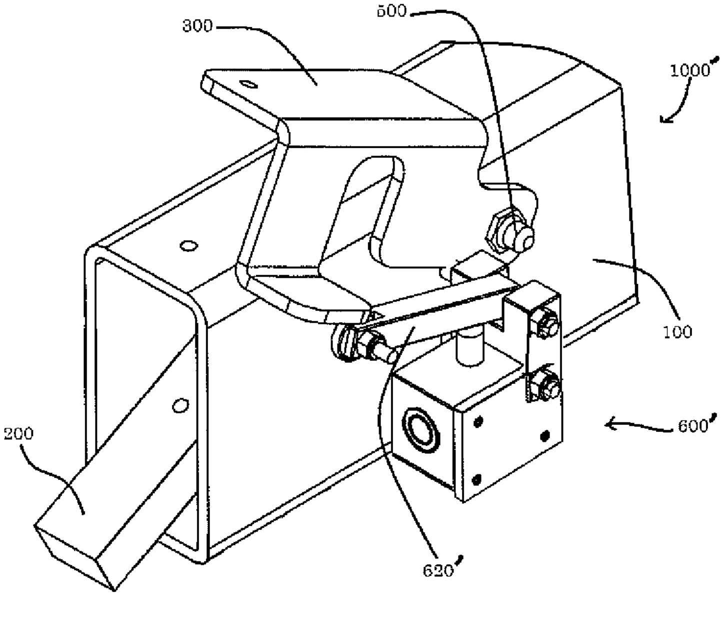

Although example embodiments illustrate the control system 1000 as including a device 600 with a spring loaded button 610 example embodiments are not limited thereto. For example, FIGS. 12A and 12B illustrate a control system 1000' which is substantially the same as the control system 1000 except that the control system 1000' includes a plunger valve 600' having an arm 620' rather than the device 600 having the button 610. However, the principles are essentially the same, therefore, a detailed description thereof is omitted for the sake of brevity.

Figure 13A:
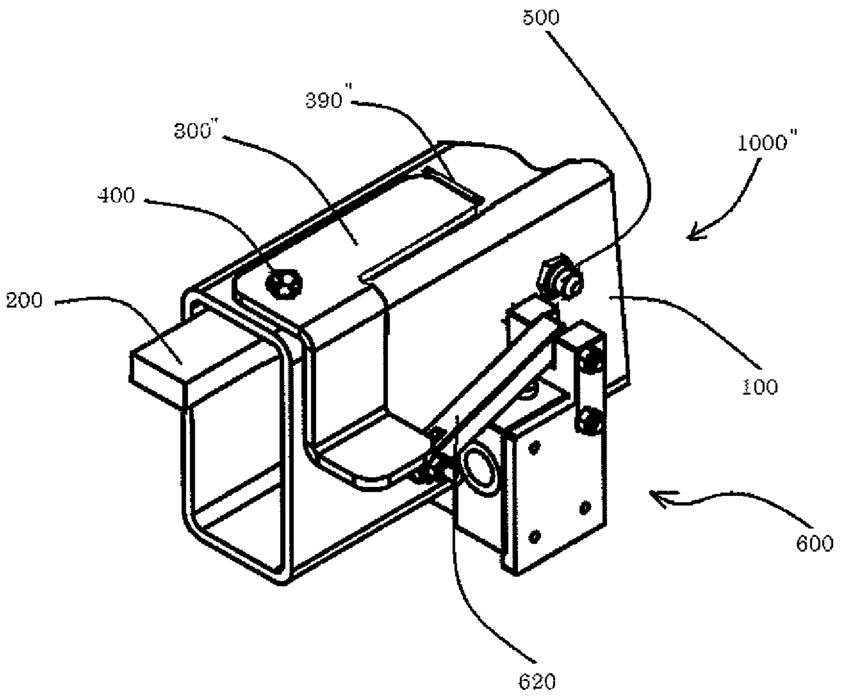
FIGS. 13A-13D are views of control systems in accordance with example embodiments.
Figure 13B:
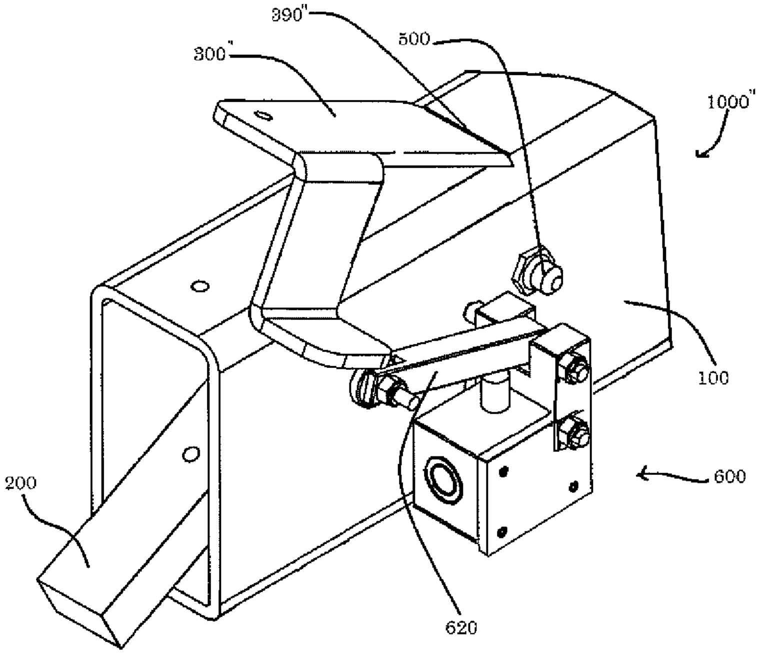

FIGS. 13A and 13B illustrate another example of a control system 1000" in accordance with example embodiments. The control system 1000" is essentially the same as the control system 1000'. Thus, only substantial differences will be pointed out for the sake of brevity. In the control system of FIGS. 12A and 12B the coupling member 300 is attached to the structural member 100 via the connecting member 500. However, in FIGS. 13A and 13B, the coupling member 300" is illustrated as being connected to the structural member 100 by a hinge 390". The hinge 390" allows the coupling member 300" to be pivotally connected to the structural member 100" without having to use the connecting member 500. Because various types of hinges are readily available and well understood, a detailed description thereof is omitted for the sake of brevity member 300". Operation of the control system 1000" is substantially similar to the earlier described control system 1000, thus, a detailed description thereof is omitted for the sake of brevity.

Figure 13C:
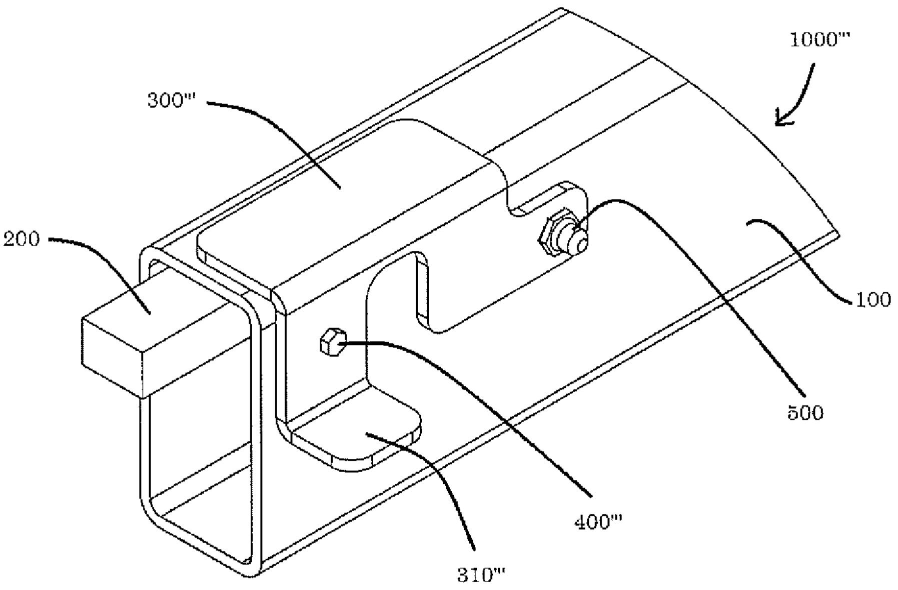
Figure 13D:
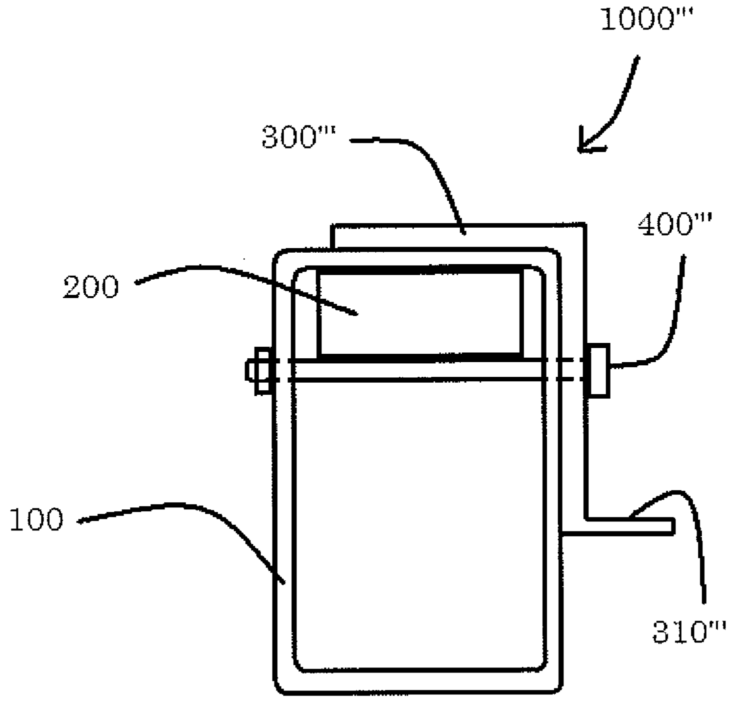

FIGS. 13C and 13D illustrate another example of a control system 1000' in accordance with example embodiments. The control system 1000' is similar to the control system 1000' illustrated in FIGS. 12A and 12B. Thus, only substantial differences will be pointed out for the sake of brevity. In FIGS. 13C and 13D a device 600, for example, a mechanical or electrical switch, or another type of device such as the plunger valve 600' is not shown. However, it is understood that the system 1000' may include such a device consistent with the example systems 1000 and 1000'.

In the control system 1000' of FIGS. 12A and 12B, the frangible member 400 penetrates the third side 130 of the structural member 100. In the control system 1000'" of FIGS. 13C and 13D, the frangible member 400'" penetrates the first and second sides 110 and 120 of the structural member 100. Although not specifically shown in FIGS. 13C and 13D, it is understood that a region of the coupling member 300'" corresponding to the fourth portion 340 of the coupling member 300 may include a hole through which a frangible member 400" may be inserted. It is also understood that the structural member 100 of FIGS. 12A and 12B also include holes in the first and second sides 110 and 120 through which at least a portion of the frangible member 400'" may be inserted. The frangible member 400" may resemble the frangible member 400 illustrated in FIG. 11, however, in the system 1000', the length Lf of the frangible member 400'" may be configured so as to extend through the coupling member 300'" and the structural member 100 as shown in FIG. 13D.

In the system 1000', a relatively large load applied to the tilt tab 200 may cause the frangible member 400 to break. Likewise, in the system 1000', a relatively large load applied to the tilt tab 200 may cause the frangible member 400''' to break. In the system 1000', the failure mode of the frangible member 400 is related to a tensile stress whereas, in the system 1000', the failure mode of the frangible member 400''' is related to a shear stress. Example embodiments, however, are not limited by the above examples. For example, a system may alternatively include a frangible member having an ear supporting a tilt tab. In this particular nonlimiting example, a load applied to the tilt tab may induce a torsional stress in the frangible member. Thus, example embodiments also provide for a system in which the frangible member fails due to a torsional stress. In other words, example embodiments provide for systems in which a frangible member may fail to due any one of (or a combination of) tensile, shear, or torsional stresses.

Figure 14A:
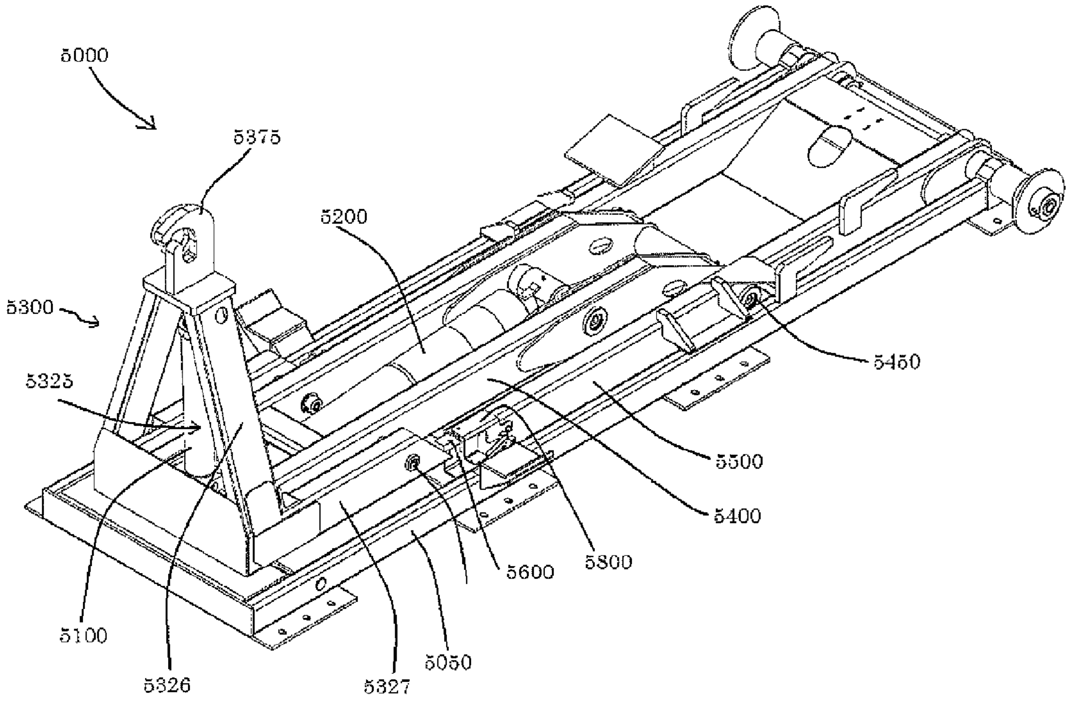
FIGS. 14A-14C are views of a lift frame in accordance with example embodiments.
Figure 14B:
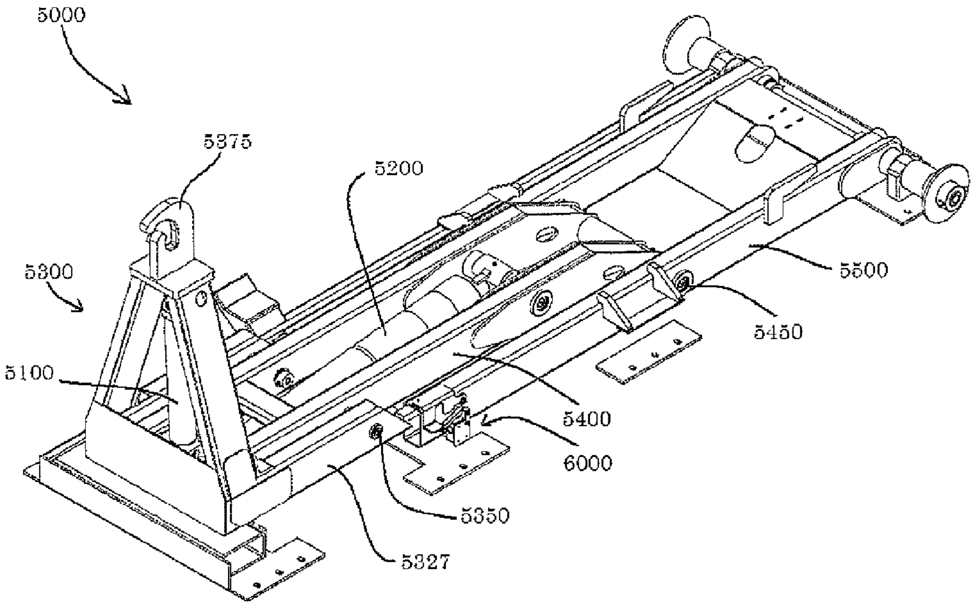
Figure 14C:
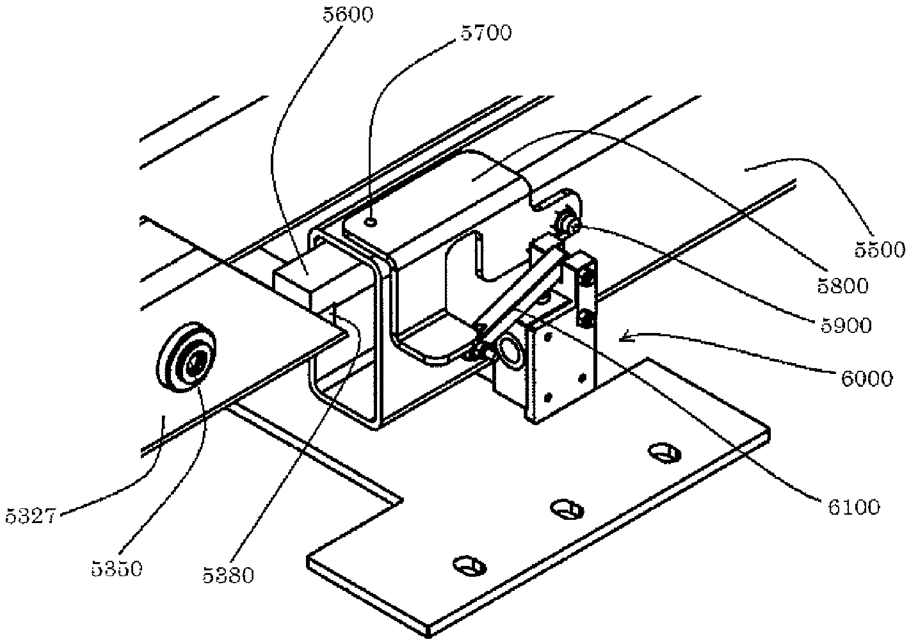

FIGS. 14A and 14B are views of a lift frame 5000 in accordance with example embodiments. FIG. 14C is a closeup view of a portion of the lift frame 5000. FIG. 14B represents the same information as FIG. 14A except a primary frame member 5050 is removed to illustrate various features of example embodiments. In example embodiments, the lift frame 5000 may, for example, be mounted on the back of a vehicle, for example, a truck, a car, a boat, or an airplane. As shown in at least FIGS. 14A and 14B, the lift frame 5000 may be equipped with a first actuator 5100 and a second actuator 5200 for moving various parts of the lift frame 5000. The first actuator 5100 and the second actuator 5200 may, for example, be hydraulic or pneumatic cylinders, though example embodiments are not limited thereto.

In example embodiments, the lift frame 5000 may include a tilt section 5300 which may include a substantially L-shaped tilt link 5325 when viewed from a side thereof. In example embodiments, the tilt link 5325 may have a first member 5326 and a second member 5327. The tilt section 5300 may be attached to a secondary frame member 5400 by a pin 5350. Thus, the tilt section 5300 may pivot with respect to the secondary frame member 5400 because of the pin-type connection. The tilt section 5300 may also include a hook 5375 which may be usable for grabbing a bar of a bin, for example, a trash bin. As will be explained shortly, the first actuator 5100 may have one end attached to the tilt section 5300. Thus, the first actuator 5100 may be configured to rotate the tilt section 5300.

In example embodiments, the secondary frame member 5400 may be pivotally attached within the lift frame 5000. For example, the secondary frame member 5400 may be connected to a dump link 5500 by a pin 5450 as shown in FIG. 14A and therefore may be configured to pivot with respect to the dump link 5500. The second actuator 5200 may be attached to the secondary frame member 5400. Thus, the second actuator 5200 may be configured to pivot the secondary frame member 5400.

In example embodiments, the lift frame 5000 may further include the dump link 5500. The dump link 5500 may resemble a relatively long tubular member. For example, the dump link 5500 may be fabricated from rectangular tube steel. The dump link 5500 may have one end pivotally connected to the lift frame 5000 and thus may pivot with respect to the lift frame 5000. In example embodiments, the dump link 5500 may have a dump link tab 5600 provided therein. The dump link tab 5600 may, for example, resemble the tilt tab 200 according to example embodiments. Example embodiments, however, are not limited thereto as the dump link tab 5600 may also resemble the tilt tab 200' or the tilt tab 200" or another similarly configured tilt tab. In example embodiments, the dump link tab 5600 may be held in place by a frangible member 5700 which may also hold a coupling member 5800 in place. In example embodiments, the frangible member 5700 and the coupling member 5800 may resemble the frangible member 400 and the coupling member 300 in accordance with example embodiments. In example embodiments, the coupling member 5800 and the dump link tab 5600 may pivotally attached to the dump link 5500 by a connecting member 5900 which may resemble the connecting member 500 in accordance with example embodiments. In example embodiments, the dump link 5500 may be configured similar to the structural member 100. Thus, though not specifically shown in FIGS. 14A, 14B, and 14C, the dump link 5500 may include holes through which the frangible member 5700 and the connecting member 5900 may pass. These holes, for example, may resemble the holes 102 and 104 of the structural member 100.

In example embodiments, a plunger valve 6000 may be provided on the lift frame 5000 and adjacent the coupling member 5800. For example, the plunger valve 6000 may be attached to the primary frame member 5050. The plunger valve 6000 may include an arm 6100 that may control an operation of the valve. For example, the arm 6100 may allow a fluid to flow through the plunger valve 6000 in the event the arm 6100 is pressed downwards and may prevent fluid from flowing through the plunger valve 6000 in the event the arm 6100 is allowed to rotate upwards. In example embodiments the plunger valve 6000 may be configured to apply a force against the coupling member 5800. For example, the plunger valve 6000 may include a biasing member, for example, a spring, that biases (for example, by rotating) the arm 6100 into the coupling member 5800. In the alternative, the plunger valve 6000 may be configured so that a hydraulic pressure rotates the arm 6100 into the coupling member 5800.

In example embodiments, the arm 6100 may be pressed downward by the coupling member 5800 when the arm 6100 is secured in place by the frangible member 5700. A line, for example, a hydraulic or pneumatic line, may run from the plunger valve 6000 to the first actuator 5100. In this particular nonlimiting example embodiment, when the arm 6100 is pressed down, fluid may flow through the plunger valve 6000 and to the first actuator 5100. In the event frangible member 5700 breaks, the coupling member 5800 may be free to rotate about the coupling member 5800 and thus may allow the arm 6100 to rotate upwards stopping the fluid from flowing to the first actuator 5100. Thus, in the event the frangible member 5700 breaks, the first actuator 5100 may be disabled. In example embodiments, the plunger valve 6000 may be attached to the frame 5000, for example, by bolting, welding, clamping, or pinning.

In example embodiments, the tilt link 5300 may have a tilt tab 5380 provided therein. The tilt tab 5380 may resemble a bar, for example, a metal bar, which may be arranged so that an upper face of the tilt tab 5380 faces a lower surface of a dump link tab 5600. As will be explained shortly, the lift frame 5000 may be incorrectly operated such that the tilt tab 5380 applies a downward force against the dump link tab 5600. In the event the tilt tab 5380 provides an excessive downward force against the dump link tab 5600, the frangible member 5700 holding the dump link tab 5600 in place may break allowing the dump link tab 5600 to rotate downwards. Of course, in the event the frangible member 5700 did break, the coupling member 5800 may be incapable of holding the arm 6100 of the plunger valve 6000 down. Accordingly, the arm 6100 may rotate upwards and fluid flow flowing to the first actuator 5100 may be cut off by the plunger valve 6000. Accordingly, if the frangible member 5700 breaks, the first actuator 5100 may not be operable.

Thus far, control systems according to example embodiments have been described. In the control systems, a coupling member (for example, 300 and 300') is used to couple a tilt tab (for example, 200, 200', and 200") to a device (for example, 600 and 600') which may, in turn, be used to control an external system 700. In example embodiments, the device (for example, 600 and 600') used to control the external system 700 may be configured to rotate the coupling member. For example, the device may include a biasing member (for example, a spring) to rotate the coupling member in the event the frangible member breaks. As another example, the device 600, may be hydraulic in nature and may be configured to exert a hydraulic pressure against the coupling member. In addition, the coupling member may be configured with a counterweight that may rotate the coupling member away from the device in the event the frangible member breaks.

In example embodiments, the lift frame 5000 may be operated in at least two modes. The first mode is related to a container loading and unloading operation. The second mode is related to a dumping operation.

Figure 15A:
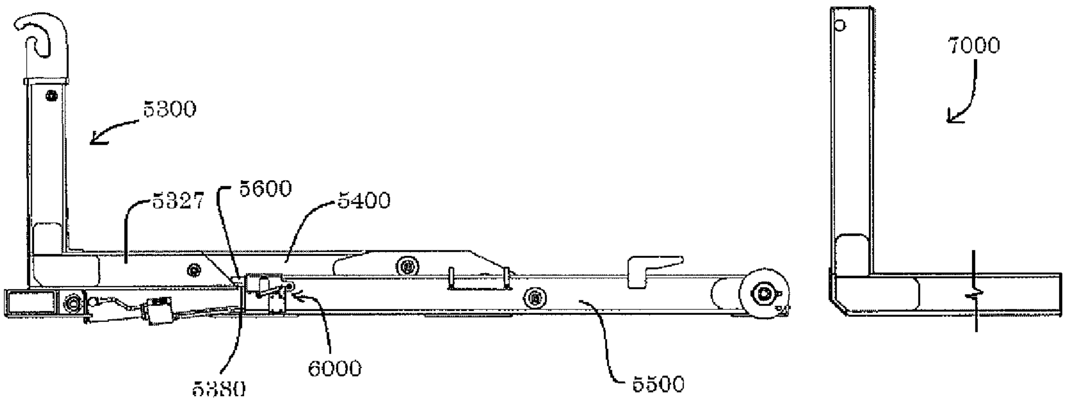
FIGS. 15A-15H are views of the lift frame during a loading operation in accordance with example embodiments.
Figure 15B:
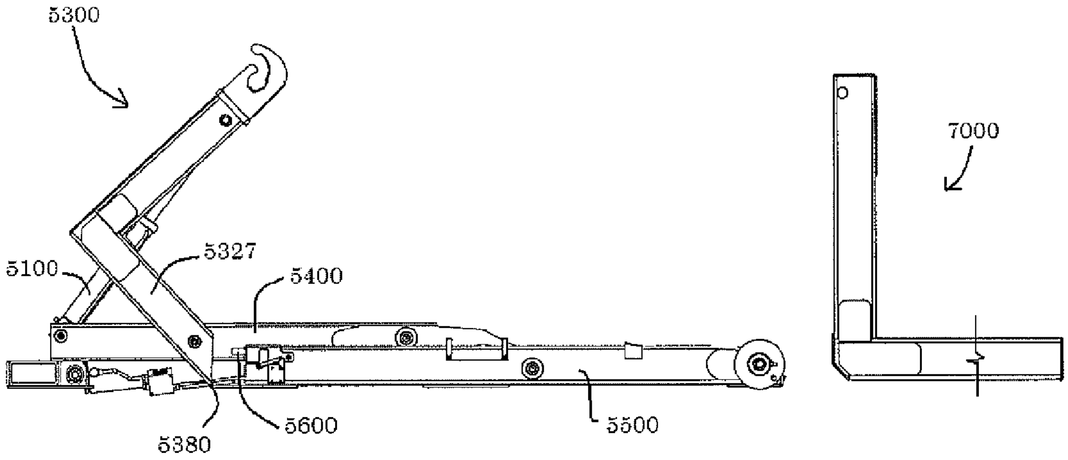
Figure 15C:
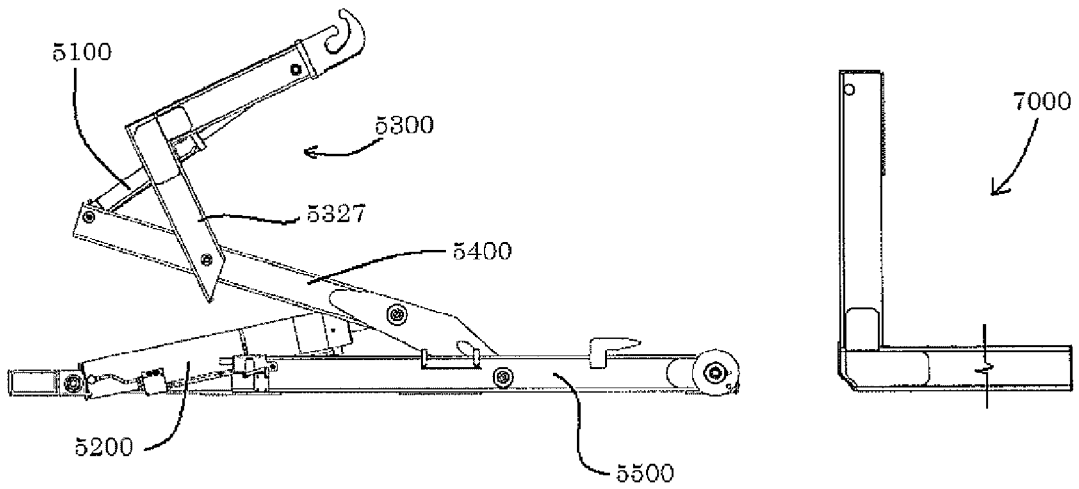
Figure 15D:
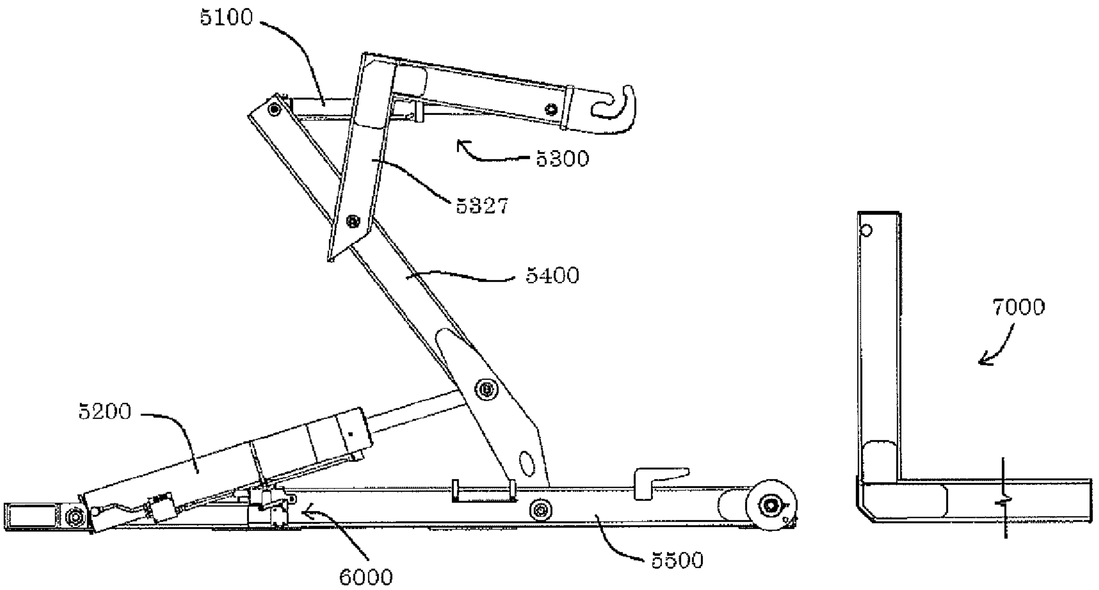
Figure 15E:
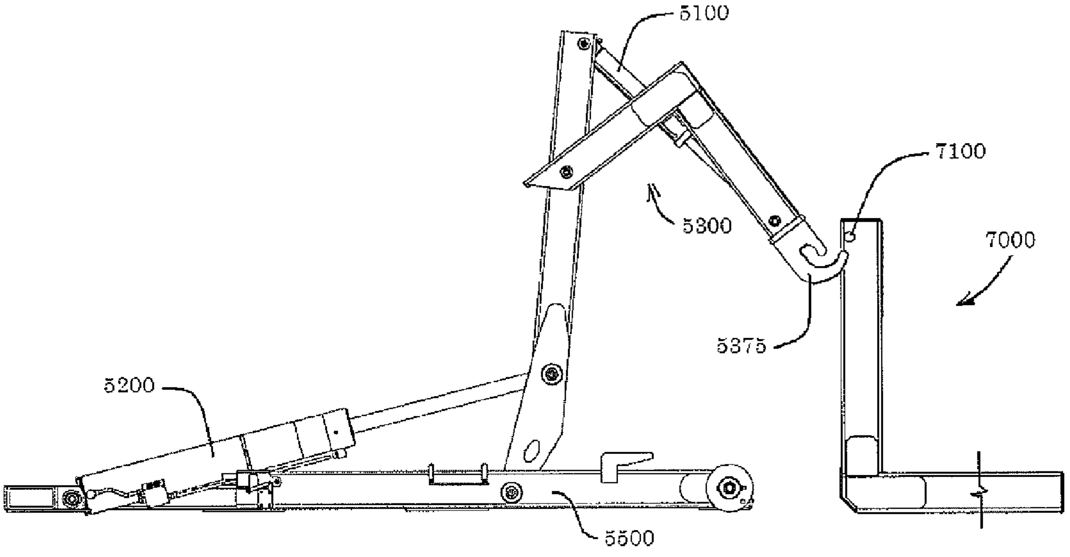
Figure 15F:
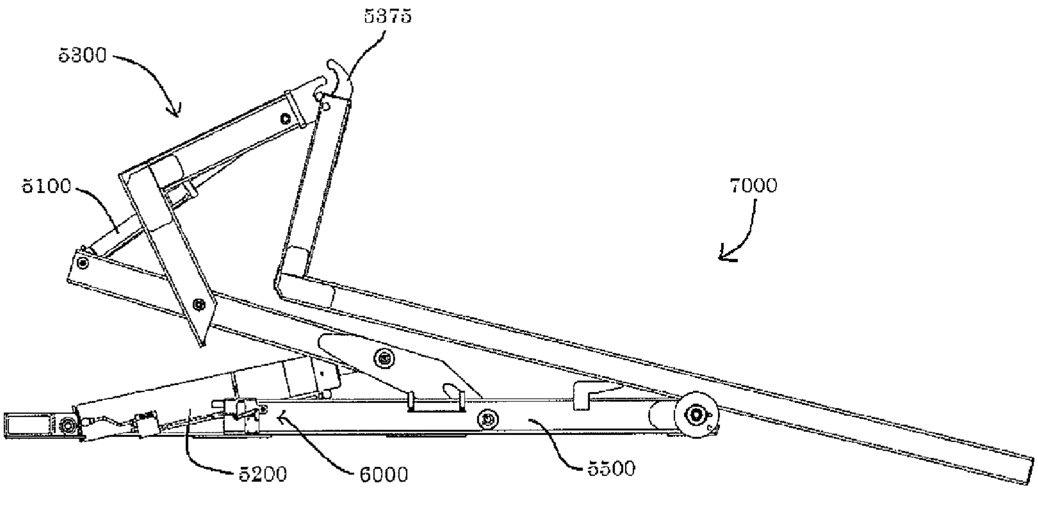
Figure 15G:
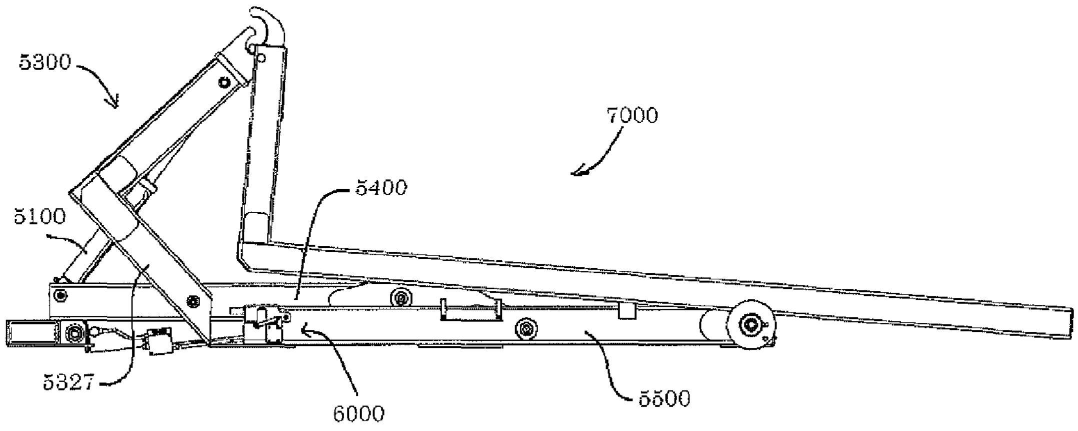
Figure 15H:
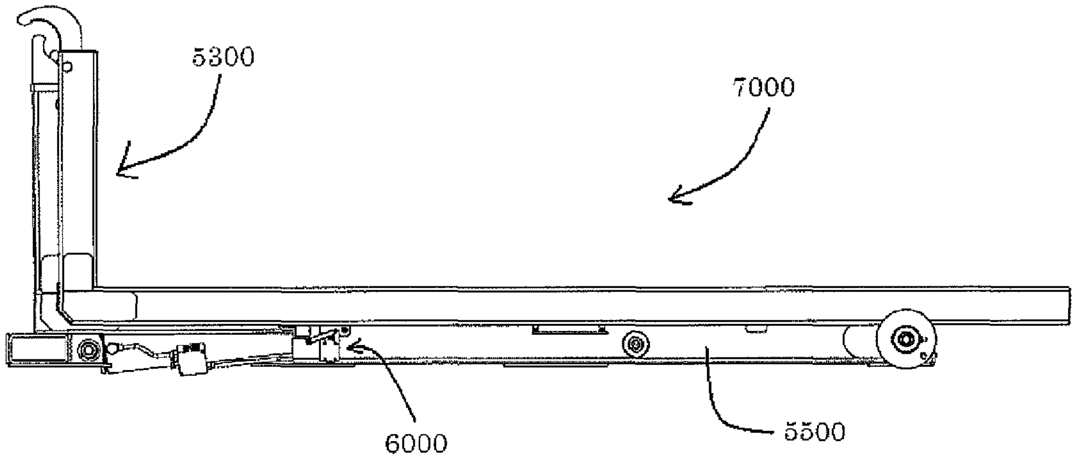

FIGS. 15A-15G illustrate various configurations of the lift frame 5000 used in a loading operation. FIG. 15A, for example, represents the lift frame 5000 being in a home position. In the home position the second member 5327 of the tilt section 5325 is substantially aligned with the secondary frame member 5400 and an upper face of the tilt tab 5380 faces a lower face of the dump link tab 5600. In example embodiments, the upper face of the tilt tab 5380 may actually contact the lower surface of the dump link tab 5600. In example embodiments, the first actuator 5100 may be operated to rotate the tilt tab 5380 away from the dump link tab 5600 as shown in FIG. 15B. After the tab 5380 has been sufficiently rotated away from the dump link tab 5600 the second actuator 5200 may be operated to rotate both of the tilt section 5300 and the secondary frame member 5400 as shown in FIG. 15C. FIGS. 15D and 15E show the second actuator 5200 continuing to rotate the tilt section 5300 and the secondary frame member 5400 about the pin 5450 until the hook 5375 is in a position to grab a grab bar 7100 of a container 7000. Once the grab bar 7100 of the container 7000 is grabbed by the hook 5375 the second actuator may be operated in a reverse fashion to pull the container 7000 onto the lift frame 5000 as shown in FIG. 15F. FIG. 15G illustrates the lift frame 5000 wherein second actuator 5200 is pulled back to its home position. In this position, the tilt section 5300 is still rotated away from its home position. In example embodiments, the first actuator 5100 may again be operated to rotate the tilt section 5300 back to its home position. At the home position, once again, the tilt tab 5380 of the tilt section 5300 and the dump link tab 5600 are arranged so that the tilt tab 5380 is under the dump link tab 5600. In example embodiments, the container 7000 may be unloaded by simply reversing the above operations.

Figure 16A:
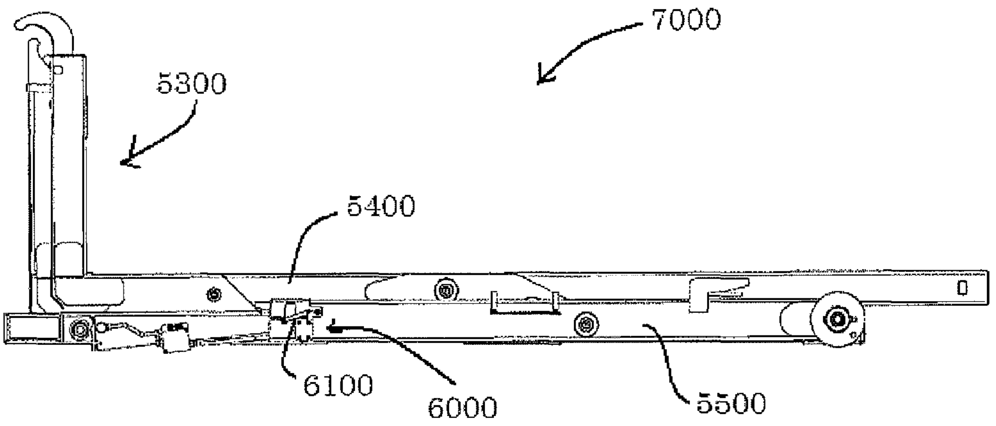
FIGS. 16A-16B are views of the lift frame during a dumping operation in accordance with example embodiments.
Figure 16B:
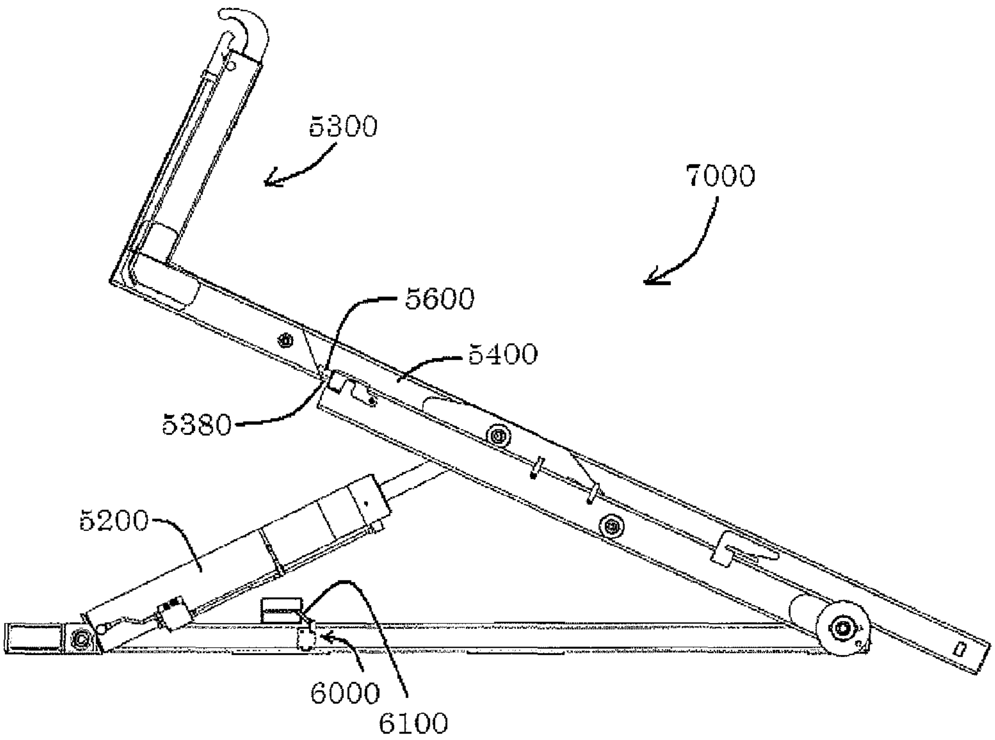

FIGS. 16A and 16B illustrate a dumping operation of the lift frame 5000. In the dumping operation the second actuator is operated such that the dump link 500 and the tilt section 5300, and the secondary frame member 5400 are simultaneously rotated to the dumping position as shown in FIG. 16B. In example embodiments, because the coupling member 5800 has been rotated away from the plunger valve 6000, the arm 6100 of the plunger valve is free to rotate upwards thus shutting off a flow of fluid that may travel to the first actuator 5100. Thus, in example embodiments, the first actuator 5100 may not be operable when the lift frame 5000 is being operated in the dump mode.

Figure 17:
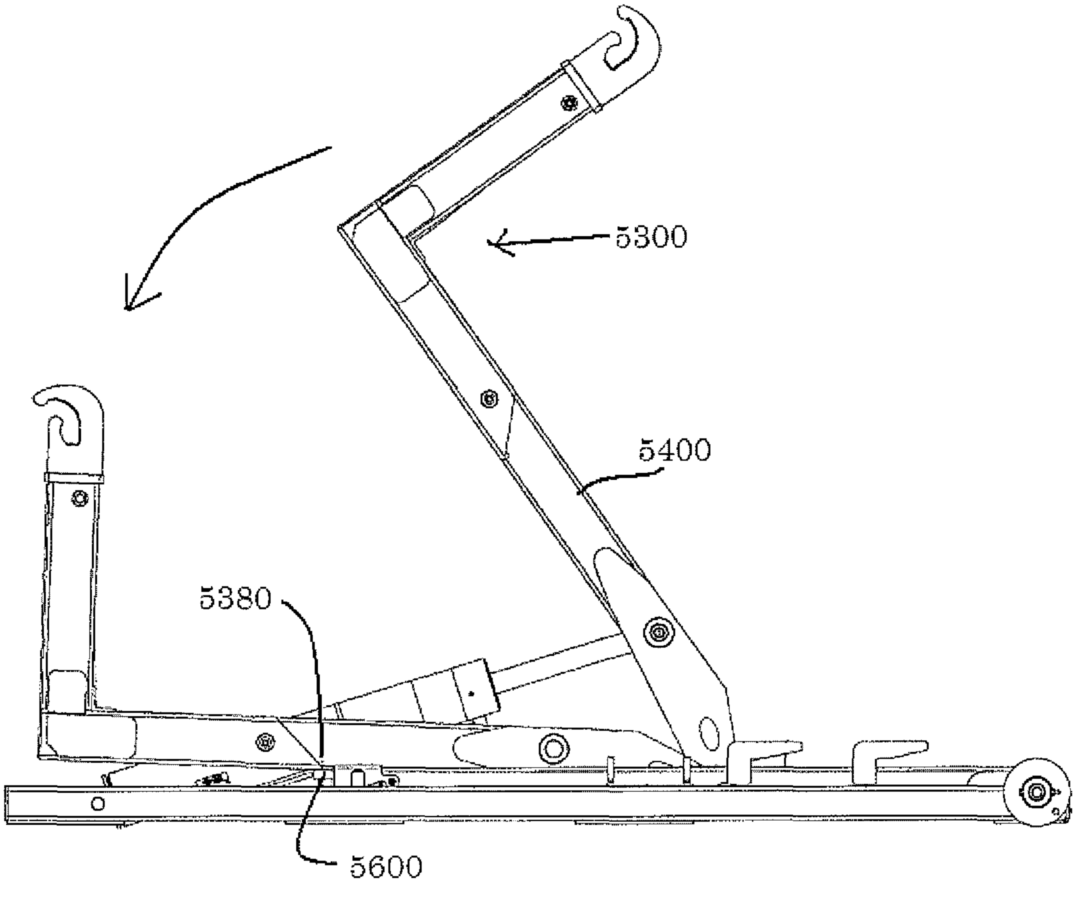
FIG. 17 is a view of the lift frame being incorrectly operated in accordance with example embodiments.

In example embodiments, it is possible that the lift frame 5000 may be operated incorrectly. For example, in FIGS. 15A-15H the tilt section 5300 is kept in a rotated configuration until the secondary member 5400 is moved to its home position. In this configuration, if the tilt section 5300 is rotated back to its home position the tilt tab 5380 will properly align with the dump link tab 5600. However, in the event an operator were to rotate the tilt section 5300 too soon, for example, as shown in FIG. 17, such that the second member 5327 of the tilt section 5300 is aligned with the secondary frame member 5400 and the second actuator 5200 is then operated to move the second frame member 5400 back to its home position, the second member 5327 of the tilt section 5300, or the tilt tab 5380 may be moved onto the top of the dump link tab 5600. In the event the above operations occur, the tilt tab 5380 may exert a relatively large force on the dump link tab 5600. However, because the dump link tab 5600 is supported by the frangible member 5700, if the above operation did occur, frangible member 5700 would break allowing the dump link tab 5600 to rotate away from the dump link tab 5600 and/or the second member 5327 of the tilt section 5300. In addition, if the frangible member 5700 did break, the coupling member 5800 would no longer be capable of exerting enough force on the arm 6100 of the plunger valve 6000. Thus, the arm 6100 would rotate shutting off a fluid flow to the first actuator 5100 to disable the first actuator 5100.

Example embodiments are drawn to a control system, non limiting examples of which have been provided in the specification. The control system may include a tab connected to a device (for example, a sensor or a valve) by a coupling member. The device may control a system external to the control system. The external system, for example, may be a hydraulic or pneumatic cylinder, though the invention is not limited thereto. The tab and the coupling device may be connected to a structure by a frangible member. The tab and the coupling device may also be connected to the structure by a connecting member. In example embodiments, each of the tab and the coupling member may be connected to the structure by a common member or by different members. The control system is easily implemented in various devices such as a frame of a dump truck. Furthermore, the control system may act as a mechanical fuse in that a system, for example, a hydraulic or pneumatic system may be disabled in the event an excessive load is applied to the control system.

While example embodiments have been particularly shown and described with reference to example embodiments thereof, it will be understood by those of ordinary skill in the art that various changes in form and details may be made therein without departing from the spirit and scope of the invention.

What we claim is:

1. A control system, comprising:

a tab pivotally connected to a structure;

a coupling member pivotally connected to the structure;

a frangible member configured to prevent the tab and coupling member from rotating with respect to the structure; and a device operatively connected to the tab via the coupling member, wherein the device is configured to control an external system.

2. The control system according to claim 1, wherein the tab and the coupling member are pivotally connected to the structure by different connecting members.

3. The control system according to claim 2, wherein the coupling member is pivotally connected to the structure via a hinge and the tab is pivotally connected to the structure via a connection member having a head and a body.

4. The control system according to claim 1, wherein the tab and the coupling member are pivotally connected to the structure by a same connecting member.

5. The control system according to claim 1, wherein the device is one of a valve and a sensor.

6. The control system according to claim 1, wherein the structure is a tubular member.

7. The control system according to claim 1, wherein the frangible member connects the coupling member and the tab to the structure.

8. The control system according to claim 7, wherein the frangible member is a breakaway bolt.

9. The control system according to claim 7, wherein the device is configured to one of enable or disable the external system in response to the frangible member breaking.

10. A vehicle comprising:

the control system of claim 1, wherein the external system is a system associated with the vehicle.

11. The vehicle of claim 10, wherein the control system is configured to one of enable and disable the external system based on whether the frangible member is broken.

12. The vehicle of claim 10, wherein the frangible member is a breakaway bolt.

13. The vehicle of claim 10, wherein the external system is an actuator.

14. The vehicle of claim 13, wherein the actuator is one of a hydraulic and pneumatic cylinder.

15. The vehicle of claim 10, further comprising:

a tilt tab configured to engage the tab of the control system.

16. The vehicle of claim 10, further comprising:

a frame member to which the device is attached, wherein the structure is a dump link.

17. The vehicle of claim 16, further comprising:

a tilt section which includes a first actuator, wherein the device is one of a valve and a sensor.

18. The vehicle of claim 10, wherein the structure is a dump link, the tab is comprised of a metal bar having a tube at one end and a hole through which the frangible member is inserted; and the coupling member includes a first portion configured to engage the device and a second portion through which the frangible member is inserted.

19. The vehicle according to claim 18, further comprising:

a connecting member passing through the tube and the coupling member to pivotally attach the tab and the coupling member to the structure.

* * * * *